United States Patent [19]

Casey et al.

[11] Patent Number: 5,567,741
[45] Date of Patent: Oct. 22, 1996

[54] AERATED ANAEROBIC COMPOSITIONS WITH ENHANCED BULK STABILITY

[75] Inventors: T. Eisirt Casey, Lucan; Peter J. Nevin, Churchtown, both of Ireland

[73] Assignee: Loctite (Ireland) Limited, Ireland

[21] Appl. No.: 72,895

[22] Filed: Jun. 3, 1993

[51] Int. Cl.$^6$ .................................................. C08J 9/04
[52] U.S. Cl. ........................... 521/133; 252/307; 252/350; 521/149; 521/182; 521/186; 521/189
[58] Field of Search .................................. 521/133, 182, 521/149, 186, 189; 252/307, 350

[56] References Cited

U.S. PATENT DOCUMENTS

| | | |
|---|---|---|
| 2,628,178 | 2/1953 | Burnett et al. . |
| 2,895,950 | 7/1959 | Krieble . |
| 3,043,820 | 7/1962 | Krieble . |
| 3,218,305 | 11/1965 | Krieble . |
| 3,795,641 | 3/1974 | Lees et al. . |
| 3,837,963 | 9/1974 | Frauenglass et al. ................... 156/310 |
| 3,856,539 | 12/1974 | Mallow et al. ............................ 106/75 |
| 3,980,627 | 9/1976 | McDowell et al. ...................... 526/328 |
| 4,090,997 | 5/1978 | Patel et al. .............................. 526/219 |
| 4,138,449 | 2/1979 | Baldwin et al. . |
| 4,209,604 | 6/1980 | Werber .................................... 526/270 |
| 4,215,209 | 7/1980 | Chaudhusi et al. ..................... 526/320 |
| 4,235,986 | 11/1980 | Catena .................................... 526/320 |
| 4,269,945 | 5/1981 | Vandeshides et al. .................. 521/159 |
| 4,309,334 | 1/1982 | Valitsky ..................................... 521/54 |
| 4,309,526 | 1/1982 | Baccei ...................................... 528/75 |
| 4,431,787 | 2/1984 | Werber .................................... 526/240 |
| 4,530,988 | 7/1985 | Werber .................................... 526/270 |
| 4,569,977 | 2/1986 | Werber .................................... 526/204 |
| 4,855,001 | 8/1989 | Damico et al. ....................... 156/307.3 |
| 4,857,131 | 8/1989 | Damico et al. ....................... 156/331.4 |
| 4,997,861 | 5/1991 | Hechenberger ........................ 523/176 |
| 5,045,572 | 9/1991 | Plotkin et al. ............................. 522/31 |
| 5,098,743 | 3/1992 | Juday ..................................... 427/295 |

FOREIGN PATENT DOCUMENTS

WO9202306  2/1992  European Pat. Off. .

*Primary Examiner*—James J. Seidleck
*Assistant Examiner*—John M. Cooney, Jr.
*Attorney, Agent, or Firm*—Edward K. Welch, II; Eugene F. Miller

[57] ABSTRACT

A storage stable anaerobic composition which does not require constant aeration with a viscosity between 50,000 to 5,000,000 mPa.s and a volume expansion of between about 1 to 20% due to the creation within the composition by aeration of stable, uniform, microcellular foam.

17 Claims, No Drawings

AERATED ANAEROBIC COMPOSITIONS WITH ENHANCED BULK STABILITY

BACKGROUND OF THE INVENTION

This invention relates to acrylate based anaerobic curing compositions which are storage stable. Anaerobic curing compositions, if continually exposed to an adequate supply of air or oxygen, remain in an uncured state over long periods of time. However, once the air or oxygen is excluded, these compositions rapidly cure. Depending on the formulation of the compositions, they may be used as anaerobic adhesives or anaerobic sealants.

Anaerobic curing compositions which can be used as adhesives or sealants are well Known in the art. Typical anaerobic curing compositions are described in U.S. Pat. Nos. 2,895,950 (Krieble), 3,043,820 (Krieble) and 3,218,305 (Krieble).

The characteristic of premature polymerization in oxygen-free environments can cause problems in packaging anaerobic curing compositions. At present, one option has been to package anaerobic curing compositions in air permeable containers with large amounts of air trapped in the package. For example, to package one liter of product, a two liter container is used. This is both expensive and ecologically wasteful.

Another option has been to design packages to maximize the surface area between the anaerobic composition and the available air space. For example, currently packaging is done in long, thin, air permeable cartridges. This allows all areas of the product to be exposed to air. However, packages of such design can only hold small quantities of product and are not feasible for packaging bulk amounts.

Several solutions have been proposed to keep these anaerobically curing compositions from prematurely polymerizing. For instance, U.S. Pat. No. 2,628,178 discloses bubbling air through the composition. The problem is that this aeration would have to be continuous, and is therefore not feasible for packaging purposes. In U.S. Pat. No. 3,795,641, aeration was done in the presence of tertiary amines and compounds containing an imido group. It is believed that these compounds play a catalytic role in creating hydroperoxy sites along the backbone of the polyethylene glycol dimethacrylate. It is also believed that the aeration actually increases the level of dissolved oxygen in the composition. To achieve suitable shelf life, aeration times of at least 2 to 4 days were necessary.

In view of the foregoing, there is a continuing need in the anaerobic curing composition art for rapid and inexpensive methods to prevent premature polymerization. Also, there is a need for being able to package anaerobic compositions in bulk containers such as 5 liter pails and to increase the shelf stability of these compositions.

SUMMARY OF THE INVENTION

The present invention, in one aspect, provides a storage stable anaerobic composition comprising a foamed curable formulation.

In another aspect, the invention provides a foamed curable formulation having a viscosity between about 50,000 to 5,000,000 mPa.s and a volume expansion of between about 1 to 20% due to aeration. In yet another aspect, the invention provides a method for preparing a storage stable anaerobic composition.

DETAILED DESCRIPTION

The present invention involves aerating an acrylate composition at a fixed flow rate with vigorous mixing so that volume expansion of the composition occurs due to the formation of uniform, stable, microcellular foam. The viscosity of the acrylate composition should be between about 50,000 to 5,000,000 mPa.s at 25° C., and preferably between about 200,000 to 1,000,000 mPa.s. These viscosity ranges refer to viscosity as measured on a Brookfield viscometer. A Brookfield RVT model at 2.5 rpm was used for lower viscosities (50,000 to 150,000) and a Brookfield HBT model at 0.5 rpm was used for higher viscosities (150,000 to 5,000,000).

If the acrylate composition has a viscosity lower than 50,000 mPa.s, the air bubbles or foam in the aerated formulation will flow out of the composition and it will be difficult to maintain the stable foam required by the invention. On the other hand, if the viscosity of the composition is higher than about 5,000,000 mPa.s the adhesive composition will be difficult to apply. When the composition has a viscosity between about 50,000 mPa.s to 100,000 mPa.s a viscosity enhancing material needs to be added so that stable foam will be formed.

The composition should be aerated until a suitable amount of foam is created within the composition. If too little foam is created, the resulting aerated composition will not have a desirable shelf life and if too much foam is created, the foam will take up significant room in the package, decreasing the amount of real product that can be placed in the package. Typically the aeration should last from about 10 to 40 minutes or until the aerated curable formulation has between about 1 to 20% by volume expansion due to the aeration and preferably between about 2 to 7%. There will be some settling of the foam if the composition is allowed to sit after aeration. Normally, the less viscous the composition, the more settling will occur.

The batch temperature during aeration should be between about 10° to 30° C. These compositions by their nature are unstable and if the temperature exceeds 30° C. the compositions will become too unstable to work with. Although the lower temperature of 10° C. is not critical, if the batch temperature falls below 10° C., these compositions especially the high viscosity compositions become difficult to mix.

The foamed anaerobic compositions can be used as is for most applications. However in cases where the material must be applied in a continuous bead with no spaces like in a robotic production line, the composition should be debubbled prior to its use. The debubbling process for the inventive compositions is similar to the process employed for other aerated resins and is known in the art. An apparatus specifically designed for debubbling, which can be employed for the aerated compositions of this invention, is disclosed in Publication No. WO 92/02306 published 20 Feb. 1992.

The present invention is applicable to acrylate ester based anaerobic curing compositions. These compositions comprise as the polymerizable component, an ester having the formula:

$$A-X-B$$

where A is a group having the formula:

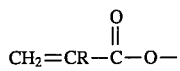

where R is H, $C_1$–$C_4$ alkyl, or halogen; and
B is H or a group having the formula:

where R is defined as above;
and X is a divalent organic group containing at least two carbon atoms and is free from ethylenic unsaturation except when present in groups of the formula:

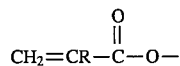

where R is defined as above.

The preferred class of acrylate esters useful in anaerobic curing compositions according to the present invention is represented by the general formula:

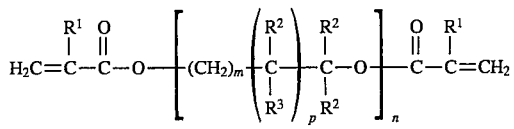

wherein each $R^1$ is a radical, independently selected from the group consisting of H, halogen and a $C_1$–$C_4$ alkyl group, preferably H or $CH_3$; each $R^2$ is a radical, independently selected from the group consisting of H, a $C_1$–$C_4$ alkyl, a $C_1$–$C_4$ hydroxyl alkyl and

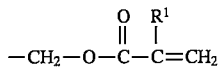

wherein $R^1$ is as described above; $R^3$ is a radical selected from the group consisting of H, hydroxyl and

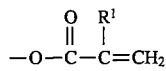

wherein $R^1$ is as described above; m is an integer of 0 to 12, preferably 1 to 8; n is an integer of at least 1, preferably from 1 to 20 or more, most preferably from 1 to 6; and p is 0 or 1.

Typical acrylate esters within this class are ethylene glycol diacrylate, dietheylene glycol diacrylate, di-, tri- and tetraethylene glycol dimethacrylate, tetraethylene glycol diacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate.

While di- and polyacrylates and methacrylates, especially the methacrylates of the above formula, are the generally preferred materials, monofunctional acrylates, i.e., those containing only one acrylate group, may also be advantageously used. Typical monoacrylates are of the general formula $CH_2=C(R)COOR^4$ where R is as described above and $R^4$ is a radical selected from the group consisting of $C_4$–$C_{16}$, preferably $C_6$–$C_{12}$ mono or bicycloalkyl; a 3 to 8 membered heterocyclic radical having at most 2 oxygen atoms in the ring; H; $C_1$–$C_{18}$, preferably $C_4$–$C_{12}$ straight chain or branched alkyl; and a $C_1$–$C_8$ hydroxyalkyl, cyanoalkyl, haloalkyl or aminoalkyl wherein the alkyl portion is either straight chain or branched. Typical monoacrylates include 2-hydroxyethyl methacrylate, cyanoethyl methacrylate, hydroxypropyl methacrylate, p-dimethylaminoethyl methacrylate, cyclohexyl methacrylate, tetrahydrofurfuryl methacrylate and chlorobenzyl acrylate.

Other useful monomers include monoacrylate monomers of the reaction product of (a) a monoacrylate monomer having a reactive site capable of reacting with a carboxyl group and (b) an unsaturated polycarboxylic acid anhydride. The reactive site of the monoacrylate reactant is selected from the group consisting of hydroxyl (—OH), primary amine (—NH2) and secondary amine (—NR'H) groups, wherein R' is a benzyl radical or an alkyl group of from 1 to 4 carbon atoms. Although the reactive site is most often a terminal reactive site, the invention includes those monoacrylate reactants having an internal reactive site. Monomers of this group are described in U.S. Pat. Nos. 4,209,604, 4,431,787, 4,530,988, and 4,569,977, which are incorporated herein by reference.

Polyurethane polyacrylates may also be employed. Monomers of this type are disclosed in U.S. Pat. Nos. 3,425,988, 4,018,851, 4,295,909, 4,309,526 and 4,574,138 and have the formula:

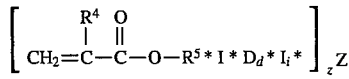

wherein $R^4$ is selected from the class consisting of hydrogen, chlorine, and methyl and ethyl radicals; $R^5$ is a divalent organic radical selected from the group consisting of lower alkylene of 1–8 carbon atoms, phenylene and naphthylene; I is a polyisocyanate radical; D is an aromatic, heterocyclic or cycloaliphatic polyol or polyamine radical, preferably a diol, and more preferably a diol of a cycloaliphatic compound; Z is a polymeric or copolymeric grafted alkylene ether or alkylene ether polyol radical; z is an integer corresponding to the valency of Z; d is either 1 or 0; and i is 0 when d is 0, and otherwise i is equal to one less than the number of reactive hydrogen atoms of D. As used herein, an asterisk (*) indicates a urethane (—NH—COO—) or ureide (—NH—CO—NH—) bond.

All of the monomers described above merely represent typical acrylate esters used in anaerobic curing compositions. Many others will be known to those skilled in the art and will be useful in anaerobic curing compositions according to the present invention.

The anaerobic curing compositions of the present invention may contain one or more catalysts, activators, and inhibitors to provide the composition with suitable curing properties.

Any catalyst commonly known in the art can be employed such as tertiary amines and compounds containing a —CO—N= group. Examples include N,N-dimethyl p-toluidine, tri-n-butylamine, 2-diethylaminoethanol, N-methyl formamide, phthalimide, succinimide, o-benzoic sulphimide and dodecyl mercaptan.

Useful activators will be compounds capable of forming free radicals, either directly or indirectly. Such compounds typically include peroxy compounds like peroxides, hydroperoxides, and peresters such as cyclohexylhydroxycyclohexyl peroxide, t-butyl hydroperoxide, t-butyl perbenzoate, hydrogen peroxide, cumene hydroperoxide, ethylene glycol dimethyl ether hydroperoxide and 2,5-dimethyl-2,5-di-(t-butylperoxy)hexane.

Typical inhibitors are quinones such as naphthaquinone, hydroquinones, sterically hindered phenols and nitroxides.

Other additives such as thixotropic agents, fillers, dyes, waxes and plasticizers may also be employed in the anaerobic curing compositions. These additives are employed for such purposes as lower cost, higher strength, improved adhesion, heat resistance, flexibility, improved low or high temperature performance, decreased shrinkage, etc. The proportions of these additives will vary depending on the desired properties of the final compositions and such proportions are well known in the art.

The addition of a viscosity enhancing material is particularly desirable in the present invention because a composition with a higher viscosity will maintain a more stable foam. Viscosity enhancing materials include thixotropic agents such as silica, fumed silica and modified clays. The preferred thixotropic agent is fumed silica.

The invention may be illustrated by reference to the following nonlimiting examples.

EXAMPLES

Example 1

Two anaerobic compositions were synthesized. Composition A was prepared according to the following formulation:

| | |
|---|---|
| Polyglycol dimethacrylate | 40–45% |
| Bisphenol A fumarate resin | 20–25% |
| Maleimide | 10–15% |
| Polymeric plasticizer | 10–15% |
| Silica, amorphous treated | 3–5% |
| Saccharin | 1–3% |
| Cumene hydroperoxide | 1–3% |
| 1-Acetyl-2-phenylhydrazine | 0.1–1% |

Composition B was prepared according to the following formulation:

| | |
|---|---|
| Polyurethane methacrylate | 70–75% |
| Polyglycol dimethacrylate | 5–10% |
| Silica, amorphous treated | 5–10% |
| Acrylic acid | 5–7% |
| Cumene hydroperoxide | 1–3% |
| Ethylene glycol | 1–3% |
| 1-Acetyl-2-phenylhydrazine | 0.1–1% |
| Saccharin | 0.1–1% |

Then, several batches of Compositions A and B were aerated for 15 to 30 minutes at an air flow rate of 0.2 liters of air/min/kg of product. The maximum temperature of the batch was kept around 30° C. Aerated composition A had a volume expansion of 16 percent and aerated composition B had a volume expansion of 3 percent. The aerated batches were allowed to settle at least one day prior to any testing.

Aerated compositions A and B and unaerated compositions A and B were tested to determine their stability. This was done by filling a glass jar completely with the composition to be tested and then aging the composition at various temperatures to measure the gel time. The shorter the gel time, the more unstable the composition. This data was then used to extrapolate what the room temperature shelf life of the composition would be. The extrapolation was done by plotting out an "Arhennius" curve using the equation:

$$Ln(\text{Time gel}) = K \times 1/\text{Temp}$$

Tables 1 and 2 illustrate the data obtained from this testing.

TABLE 1

STABILITY OF COMPOSITION A

| TEMP | UNAERATED COMPOSITION A | AERATED COMPOSITION A |
|---|---|---|
| 82° C. | 1.75 hours | 4.5 hours |
| 50° C. | 72 hours | 7.5 days |
| 45° C. | 7.5 days | 12.5 days |
| 35° C. | 13 days | 48 days |
| 30° C. (extrapolated) | 37 days | 112 days |
| 22° C. (extrapolated) | 100 days | 350 days |

TABLE 2

STABILITY OF COMPOSITION B

| TEMP | UNAERATED COMPOSITION B | AERATED COMPOSITION B |
|---|---|---|
| 82° C. | 5.25 hours | 6 hours |
| 50° C. | 7.5 days | 12.5 days |
| 45° C. | 13 days | 26 days |
| 35° C. | 45 days | 100 days |
| 22° C. (extrapolated) | 200 days | 400 days |

As can be seen from Table 1, at both elevated and room temperatures aerated Composition A is more stable than unaerated Composition A. It is estimated that aerated Composition A will have a shelf-life of about one year.

Similarly, as can be seen from Table 2, at both elevated and room temperatures aerated Composition B is more stable than unaerated Composition B It is estimated that aerated Composition B will have a shelf-life of about 14 months.

Example 2

Samples of Composition A, as prepared in Example 1 above, were aerated until there was an increase in volume ranging from 3–17%. All the samples were aerated in a 60 liter pilot plant high shear mixer. The disperser speed was about 1000 rpm and the scraper speed about 40 rpm. The disperser speed represents a tip speed of about 13 meters/second. Viscosity was measured on a Brookfield viscometer.

The aerated compositions were allowed to settle for at least one day before stability testing was done. The stability of the samples before and after aeration were compared and the results are shown in Table 3 below.

TABLE 3

STABILITY OF COMPOSITION A WITH VARIOUS AMOUNTS OF FOAM

| TRIAL NO. | QTY IN KG | VISCOSITY 2.5 RPM/20 RPM BEFORE | MIXING TIME (MIN.) | % INCREASE IN VOLUME | 82° C. STABILITY BEFORE AERATION | 82° C. STABILITY AFTER AERATION |
|---|---|---|---|---|---|---|
| 1 | 34 | 448,000/88,000 | 15 | 10 | 2.5 hours | 4.5 hours |
| 2 | 25 | 288,000/60,000 | 15 | 13 | 1.75–2 hours | 5–5.5 hours |
| 3 | 28 | 368,000/64,000 | 12 | 6.6 | 2–2.5 hours | 3.25 hours |
| 4 | 26 | 400,000/60,000 | 30 | 14 | 2 hours | 5–5.5 hours |
| 5 | 27 | 416,000/64,000 | 35 | 16 | 2 hours | 7 hours |
| 6 | 31 | 416,000/76,000 | 15 | 13 | 2.5 hours | 5 hours |

As can be seen from Table 3, varying amounts of aeration will increase the stability of the anaerobic composition. The greatest gain in stability occurred when the compositions were aerated until a volume expansion of 16% was achieved.

Obviously, other modifications and variations to the present invention are possible and may be apparent to those skilled in the art in light of the above teachings. Thus, it is to be understood that such modifications and variations to the specific embodiments set forth above, are to be construed as being within the full intended scope of the present invention as defined by the appended claims.

We claim:

1. A storage stable anaerobic composition comprising a curable acrylate monomer formulation containing one or more catalysts and/or activators having a viscosity of between about 50,000 to 5,000,000 mPa.s at 25° C., provided that the composition must include a viscosity enhancing material when the viscosity of the formulation without the viscosity enhancing material is between 50,000 and 100,000 mPa.s at 25° C. and a volume expansion due to aeration of about 1 to 20%, the volume expansion being in the form of stable, uniform, microcellular foam created by the aeration.

2. The composition of claim 1 wherein the foamed curable formulation has a volume expansion of between about 2 to 7% due to the aeration.

3. The composition of claim 1 wherein the curable formulation has a viscosity of between about 200,000 to 1,000,000 mPa.s.

4. The composition of claim 1 wherein the curable formulation further comprises a viscosity enhancing material.

5. The curable formulation of claim 4 wherein the viscosity enhancing material is the thixotropes, fumed silica.

6. A method of preparing a storage stable anaerobic composition, said composition existing as a stable, uniform, microcellular foam having from about 1 to about 20% volume expansion, comprising the steps of:

a. providing a curable acrylate monomer formulation containing one or more catalysts and/or activators and having a viscosity between about 50,000 to 5,000,000 mPa.s at 25° C.; feeding air into the formulation with vigorous stirring, at a temperature below 30° C. until a volume expansion of from about 1 to 20% is attained; and c. discontinuing aeration; with the proviso that said composition must include a viscosity enhancing material or this method further includes the step of adding a viscosity enhancing material prior to aeration when the viscosity of the curable formulation without the viscosity enhancing material is between about 50,000 to 100,000 mPa.s at 25° C.

7. The method of claim 6 wherein the foamed curable formulation comprises has a volume expansion between about 2 to 7% due to the aeration.

8. The method of claim 6 wherein the curable formulation has a viscosity between about 200,0000 to 1,000,000 mPa.s.

9. The method of claim 6 further comprising the step of adding a viscosity enhancing material to the curable formulation prior to feeding air into the formulation.

10. The method of claim 9 wherein the viscosity enhancing material is fumed silica.

11. A storage stable anaerobic composition which does not require constant aeration, said composition existing as a stable, uniform, microcellular foam having from about 1 to about 20% volume expansion, made by:

a. providing a curable acrylate monomer formulation containing one or more catalysts and/or activators having a viscosity of between about 50,000 to 5,000,000 mPa.s at 25° C., provided that the composition must include a viscosity enhancing material when the viscosity of the formulation without the viscosity enhancing material is between 50,000 and 100,000 mPa.s at 25° C.; and b. feeding air into the formulation with vigorous stirring, at a temperature below 30° C. until a volume expansion of from about 1 to about 20% is attained; and c. discontinuing aeration.

12. The composition of claim 11 wherein the foamed curable formulation has a volume expansion between about 2 to 7% due to the aeration.

13. The composition of claim 11 wherein the curable composition has a viscosity of between about 200,000 to 1,000,000 mPa.s.

14. The composition of claim 11 wherein the curable formulation further comprises a viscosity enhancing material.

15. The composition of claim 14 wherein the viscosity enhancing material is fumed silica.

16. The method of claim 6 wherein the method further comprises the step of allowing the aerated composition to settle after termination of aeration.

17. The composition of claim 11 wherein the composition is allowed to settle after termination of aeration.

* * * * *